United States Patent
Hwang (10) Patent No.: US 8,350,882 B2
(45) Date of Patent: Jan. 8, 2013

(54) OPTICAL UNIT, IMAGE FORMING APPARATUS INCLUDING THE SAME AND OPTICAL ELEMENT THEREOF

(75) Inventor: Ho-hyun Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1296 days.

(21) Appl. No.: 12/042,403

(22) Filed: Mar. 5, 2008

(65) Prior Publication Data

US 2008/0240786 A1 Oct. 2, 2008

(30) Foreign Application Priority Data

Mar. 28, 2007 (KR) .................. 10-2007-0030492

(51) Int. Cl.
*B41J 2/45* (2006.01)
(52) U.S. Cl. ................ 347/238; 359/819
(58) Field of Classification Search .......... 347/241, 347/238; 399/220; 359/819
See application file for complete search history.

(56) References Cited

U.S. PATENT DOCUMENTS

| | | | | |
|---|---|---|---|---|
| 4,506,953 A * | 3/1985 | Shimizu et al. | ............. | 359/614 |
| 5,245,481 A | 9/1993 | Kaneko et al. | | |
| 5,377,038 A * | 12/1994 | Uzuki et al. | ............. | 359/205.1 |
| 6,061,079 A * | 5/2000 | Ota et al. | ............. | 347/243 |
| 6,097,536 A * | 8/2000 | Bauer et al. | ............. | 359/350 |
| 7,094,452 B2 * | 8/2006 | Yamashita et al. | ............. | 428/1.3 |
| 7,286,307 B2 * | 10/2007 | Yamamoto et al. | ............. | 359/819 |
| 2002/0196393 A1 | 12/2002 | Tashiro et al. | | |
| 2004/0156912 A1 * | 8/2004 | Kawamura et al. | ............. | 424/489 |
| 2005/0243443 A1 * | 11/2005 | Yamamoto et al. | ............. | 359/819 |
| 2006/0056034 A1 * | 3/2006 | Tsuruma | ............. | 359/626 |

FOREIGN PATENT DOCUMENTS

| | | |
|---|---|---|
| EP | 0 895 113 | 2/1999 |
| JP | 4-180006 | 6/1992 |
| JP | 7-325241 | 12/1995 |
| JP | 8-136843 | 5/1996 |
| JP | 10-282390 | 10/1998 |
| JP | 2000-249816 | 9/2000 |
| JP | 2004-151388 | 5/2004 |
| JP | 2004-171618 | 6/2004 |
| JP | 2006-124147 | 5/2006 |
| KR | 92-12963 | 7/1992 |
| KR | 2005-114414 | 12/2005 |
| KR | 2006-13611 | 2/2006 |

OTHER PUBLICATIONS

European Office Action dated Feb. 23, 2011 in corresponding European Patent Application 08 102 595.9.
Search Report issued in European Patent Application No. 08102595.9 on Jun. 27, 2008.
Korean Office Action mailed Nov. 24, 2011 issued in corresponding Korean Patent Application No. 10-2007-0030492.

* cited by examiner

*Primary Examiner* — Charlie Peng
*Assistant Examiner* — Peter Radkowski
(74) *Attorney, Agent, or Firm* — Staas & Halsey LLP (57) ABSTRACT

An optical unit includes an optical element having a first combining surface and a second combining surface that applied an adhesive that is cured when exposed to a curing light respectively and that have different transmittance of the curing light; and a mount member combined with the optical element by the adhesive. The adhesive is cured when exposed to the curing light.

23 Claims, 13 Drawing Sheets

OPTICAL UNIT, IMAGE FORMING APPARATUS INCLUDING THE SAME AND OPTICAL ELEMENT THEREOF

CROSS-REFERENCE TO RELATED APPLICATION

This application claims all benefits accruing under 35 U.S.C. §119 from Korean Patent Application No. 2007-30492, filed in the Korean Intellectual Property Office on Mar. 28, 2007, the disclosure of which is incorporated herein by reference.

BACKGROUND OF THE INVENTION

1. Field of the Invention

Aspects of the present invention relate to an optical unit, an image forming apparatus including the same and an optical element thereof, and, more particularly, to an optical unit whose optical element can be more accurately mounted thereon by a curing adhesive, an image forming apparatus including the optical unit, and an optical element of the optical unit.

2. Description of the Related Art

An electrophotographic type image forming apparatus performs a series of processes including charging, exposing, developing, transferring and fusing to form an image onto a printable medium. Examples of an electrophotographic type image forming apparatus include a laser printer, a multifunction printer, a facsimile machine, and a copying machine. The image forming apparatus has an optical unit to perform the exposing process. Such an optical unit includes an f-θ lens to focus light scanned by a light source onto a predetermined photosensitive medium.

The f-θ lens is installed in the optical unit using an ultraviolet-curing adhesive. However, as the ultraviolet-curing adhesive contracts when cured, the f-θ lens, which was located at an ideal position before the ultraviolet-curing adhesive contracts, shifts to a position deviated from the original position after the ultraviolet-curing adhesive has contracted.

To enhance such phenomenon, a Japanese patent publication No. 2004-151388 discloses a method where a part of the ultraviolet-curing adhesive is cured prior to another part.

Figure 1:
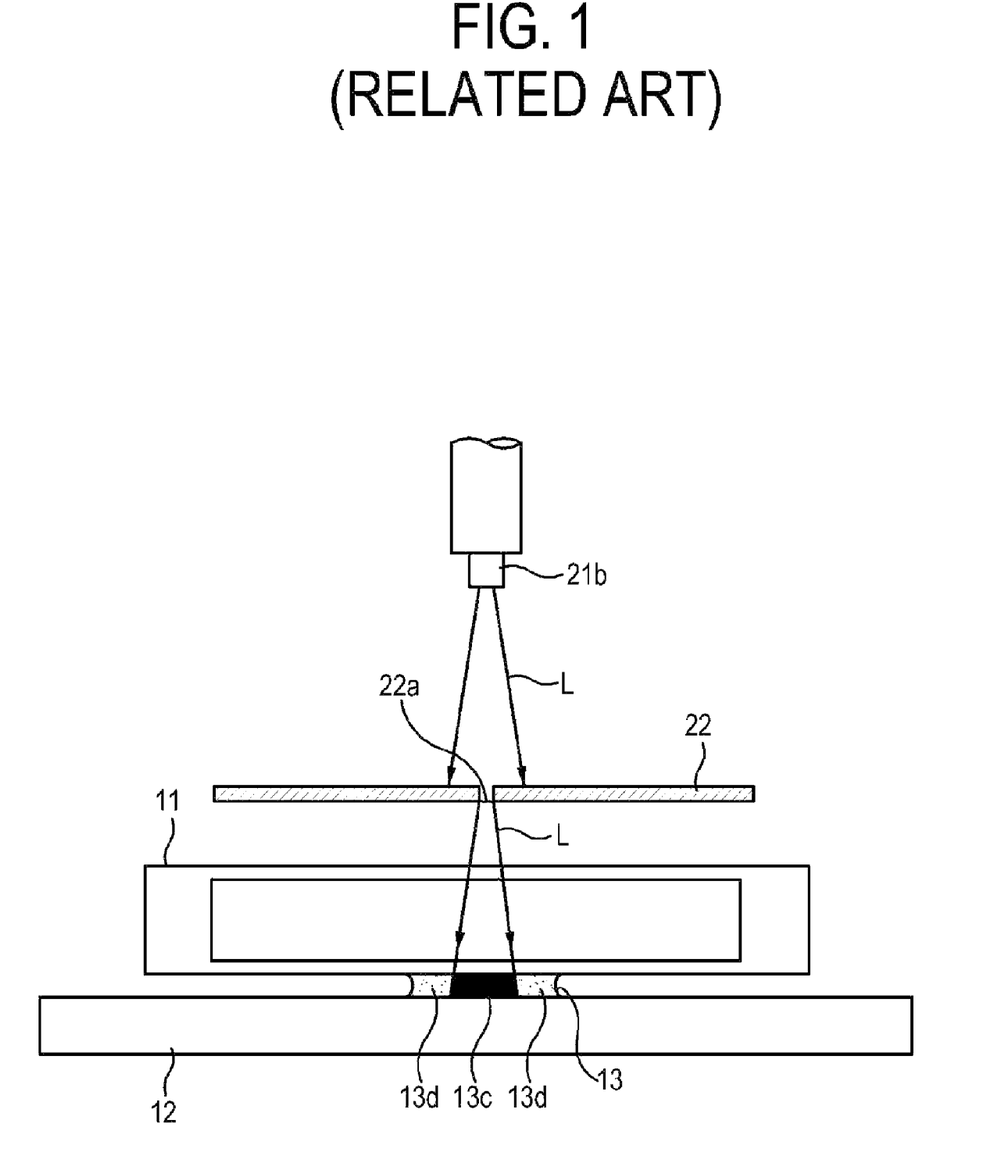
FIG. 1 is a schematic view describing a manufacturing method of a conventional optical unit.

FIG. 1 is a schematic view describing a manufacturing method of a conventional optical unit. As shown in FIG. 1, an f-θ lens 11 is precisely disposed at a predetermined position on a mount member 12 during the design process. To this end, the present position of the f-θ lens 11 is precisely measured using a sensor. The position of the f-θ lens 11 is corrected properly based on the measurement of the sensor. The ultraviolet-curing adhesive 13 is inserted between the mount member 12 and the f-θ lens 11.

First, only a center part 13c of the adhesive 13 is cured by an ultraviolet ray L, using a mask 22 having an opening 22a. Accordingly, deformation of the adhesive 13 is small as compared to curing the whole adhesive 13. The ultraviolet ray L is scanned by an ultraviolet ray scanning device 21b.

After curing the center part 13c, the mask 22 is removed to cure a surrounding part 13d. Accordingly, as a remaining part of the adhesive 13 is cured while the position of the f-θ lens 11 has been fixed by curing the center part 13c first, displacement of the f-θ lens 11 due to the contraction of the adhesive 13 can be minimized.

However, the mask 22 is required to mount the f-θ lens 11. Therefore, if the part where the adhesive is to be bonded is changed, the shape of the mask should also be changed, thus incurring costs for manufacturing, managing and maintaining the additional masks. Also, in a manufacturing process of the conventional optical unit, processes for disposing the mask 22 at a proper position and removing the mask 22 are required. Accordingly, overall manufacturing cost of the optical unit is increased.

SUMMARY OF THE INVENTION

Aspects of the present invention provide an optical unit, image forming apparatus including the same, and optical element thereof, where the optical unit can be precisely mounted on a mount member.

Another aspect of the present invention is to provide the optical unit, image forming apparatus including the same, and optical element thereof, which has a simpler manufacturing process.

Still another aspect of the present invention is to provide an optical unit, image forming apparatus including the same, and optical element thereof, where manufacturing cost can be decreased.

According to an aspect of the present invention, an image forming apparatus is provided. The image forming apparatus includes an optical unit including an optical element with a first combining surface and a second combining surface to which an adhesive to be cured when exposed to a curing light is applied and that have different transmittance of the curing light; and a mount member combined with the optical element by the adhesive; a photosensitive medium having a surface exposed by the optical unit to form an electrostatic latent image corresponding to image information; a developing unit to develop the electrostatic latent image with developer; and a transfer unit to transfer the developed electrostatic latent image to a printable medium.

According to another aspect of the invention, the first combining surface and the second combining surface have different surface roughness.

According to another aspect of the invention, the optical unit further includes a light source to emit light corresponding to image information; wherein the optical element is an f-θ lens to focus the light emitted by the light source onto a predetermined focusing surface.

According to another aspect of the invention, one of the first combining surface and the second combining surface surrounds the other.

According to another aspect of the invention, the first combining surface and the second combining surface make a pair, and the f-θ lens has a plurality of the pairs of the first combining surface and the second combining surface.

According to another aspect of the invention, the optical unit further includes a light source to emit light corresponding to image information; wherein the optical element is an f-θ lens to focus the light emitted by the light source onto a predetermined focusing surface.

According to another aspect of the invention, each of the plurality of the pairs of the first combining surface and the second combining surface is provided at opposite end parts of the f-θ lens in an extending direction of the f-θ lens.

According to an aspect of the invention, one of the first combining surface and the second combining surface has a smaller surface area than the other and has a higher light transmittance than the other.

According to another aspect of the present invention, an optical element is provided. The optical element includes a body provided with a first combining surface and a second combining surface that to which an adhesive to be cured when exposed to a curing light is applied and that have different transmittance of the curing light.

According to an aspect of the invention, the optical element is an f-θ lens to focus incident light onto a predetermined focusing surface.

According to another aspect of the present invention, a laser scanner is provided. The laser scanner includes a mount member; a lens mounted to the mount member to focus laser light onto a predetermined surface; a reflecting mirror arranged on the mount member to reflect the laser light onto the lens; a beam deflector arranged on the mount member to deflect the laser light onto the reflecting mirror; and a light generator arranged on the mount to generate the laser light; wherein the lens is mounted to the mount member at a designated area by adhesive applied to first and second portions of the designated area having different rates of light transmittance, and the adhesive is cured by a curing light.

According to another aspect of the invention, the first combining surface has a surface roughness different than a surface roughness of the second combining surface.

According to another aspect of the invention, the lens is an f-θ lens.

According to another aspect of the invention, the f-θ lens has a plurality of pairs of first combining surfaces and second combining surfaces.

According to another aspect of the invention, the first portion is surrounded by the second portion.

According to another aspect of the invention, the designated area is at an end part of the lens.

According to another aspect of the invention, the curing light is an ultraviolet light and the adhesive is cured using an ultraviolet light.

According to another aspect of the invention, wherein the first portion and the second portion are coated with different amounts of a reflective material.

According to another aspect of the invention, the first portion has a surface area smaller than a surface area of the second portion.

According to another aspect of the invention, the designated area is a center part of the lens.

According to another aspect of the invention, the mount has a lens height reference protrusion onto which the lens is coupled.

According to another aspect of the present invention, a method of manufacturing a laser scanner so as to minimize deviations caused by curing of an adhesive is provided. The method includes applying an adhesive to a first combining surface of a lens and a second combining surface of the lens, wherein the first combining surface has a light transmittance different from a light transmittance of the second combining surface; arranging the first combining surface and the second combining surface on a mount; and illuminating the adhesive with a curing light through the first combining surface and the second combining surface so that the adhesive applied to one of the first combining surface and the second combining surface cures prior to the adhesive applied to the other.

According to another aspect of the invention, the adhesive is applied to the first combining surface and the second combining surface by inserting the adhesive between the mount and the first combining surface and second combining surface.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the present embodiments of the present invention, examples of which are illustrated in the accompanying drawings, wherein like reference numerals refer to like elements throughout. The embodiments are described below in order to explain the present invention by referring to the figures.

A light scanning unit 200, such as an laser scanning unit (LSU) for an image forming apparatus, is described as an example embodiment of an optical unit. Although described with respect to an image forming apparatus, aspects of the present invention may be employed wherever a light scanning unit is used.

Figure 2:
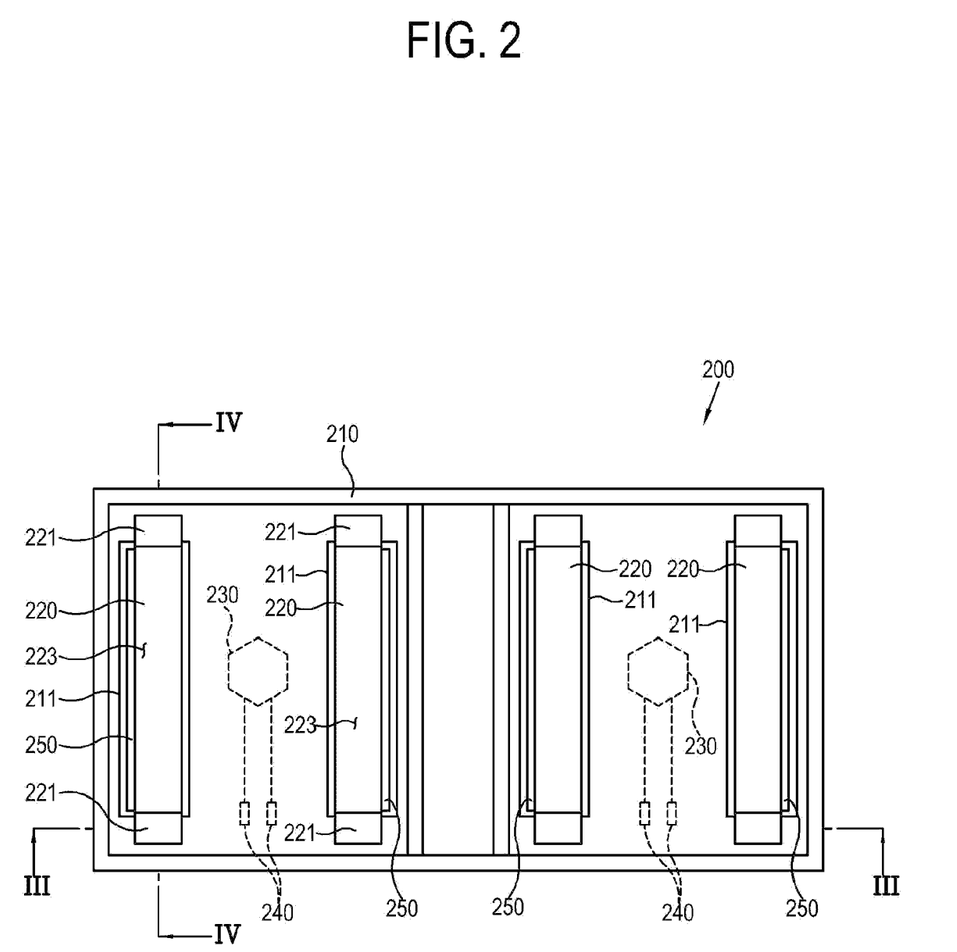
FIG. 2 is a schematic plan view of an optical unit according to an example embodiment of the present invention.
Figure 3:
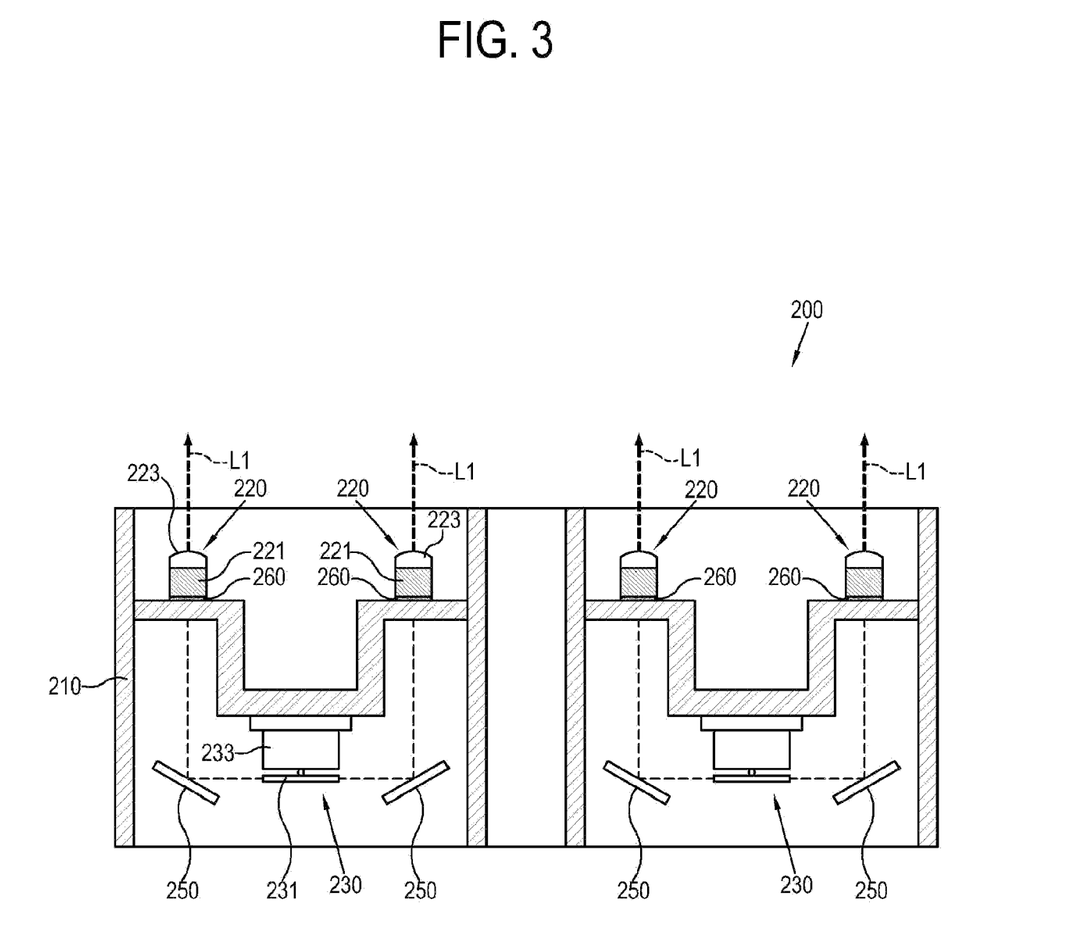
FIG. 3 is a sectional view of an optical unit along III-III of FIG. 2.

As shown in FIGS. 2 and 3, the light scanning unit 200 includes a mount member 210, a plurality of f-θ lenses 220 as the optical element, a plurality of beam deflectors 230, a plurality of light sources 240, and a plurality of reflecting mirrors 250. The light scanning unit 200 may further include a collimating lens (not shown) and a cylindrical lens (not shown), which are disposed on a path of light between the light source 240 and the beam deflector 230. According to other aspects of the invention, the light scanning unit 200 may include additional and/or different components. Similarly, the functionality of one or more of the above components may be combined into a single unit.

Light L1 emitted by the light source 240 passes through the collimating lens (not shown) to be changed into a collimated beam, and the collimated beam passes through the cylindrical lens (not shown) to converge in a sub-scanning direction (feeding direction of a printable medium). The converged beam is deflected in a main-scanning direction (a transverse direction of the feeding direction of the printable medium) by the beam deflector 230. The deflected beam is reflected by the reflecting mirror 250 toward the f-θ lens 220, and passes through the f-θ lens 220 to form an image onto a predetermined image forming surface, for example, surfaces of photosensitive media 145Y, 145M, 145C and 145K to be described later.

Figure 4:
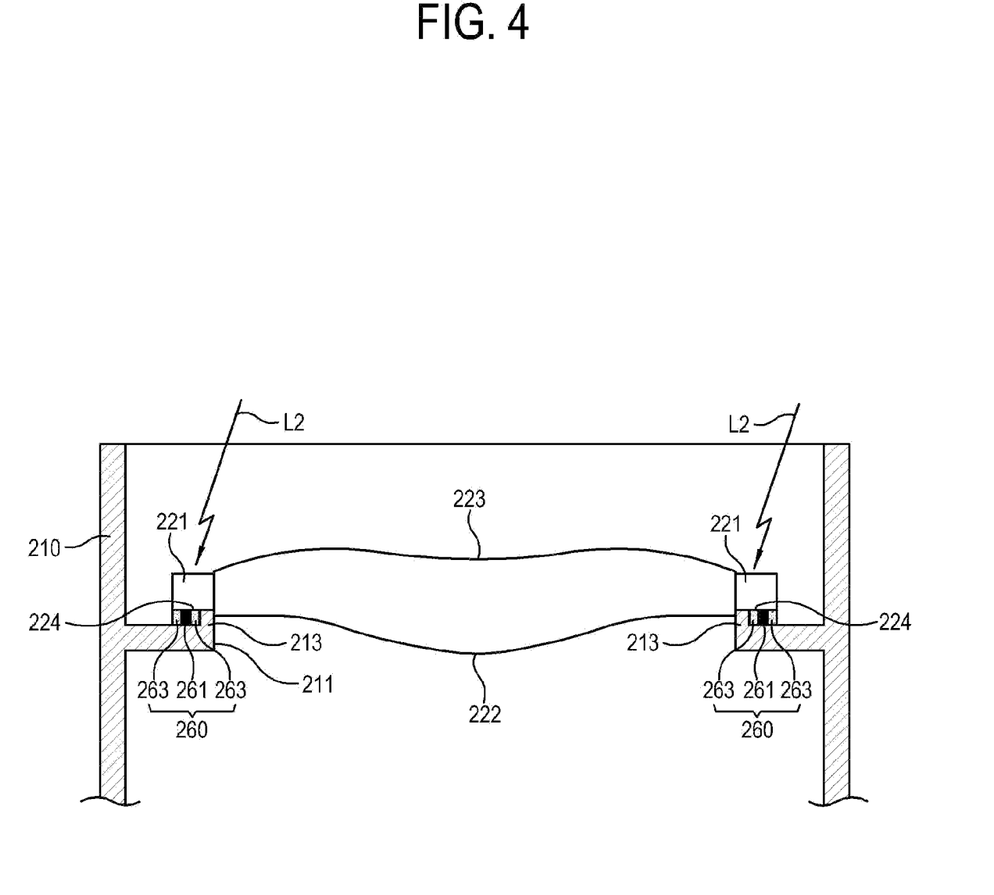
FIG. 4 is a sectional view of an optical unit along IV-IV of FIG. 2.

The mount member 210, as shown in FIGS. 2 and 3, may be a casing that forms the external appearance of the light scanning unit 200. The f-θ lens 220, the beam deflector 230, the light source 240, and the reflecting mirror 250 are installed within the mount member 210. The mount member 210 has a light passage opening 211 through which the light L1 passes so that the light L1 emitted by the light source 240 is not prevented from reaching an incident surface 222 of the f-θ lens 220. Also, as shown in FIG. 4, the mount member 210 may have a lens height reference protrusion 213 that becomes a reference surface in a height direction of the f-θ lens 220. The lens height reference protrusion 213 may be omitted.

The light source 240 may be provided as a laser diode. The light source 240 is provided to emit the light corresponding to image information of a predetermined color in the image forming apparatus (refer to 100 in FIG. 8) to be described later. The beam deflector 230 includes a polygon mirror 231 and a driving motor 233 that drives the polygon mirror 231 to rotate at a uniform velocity.

Figure 5:
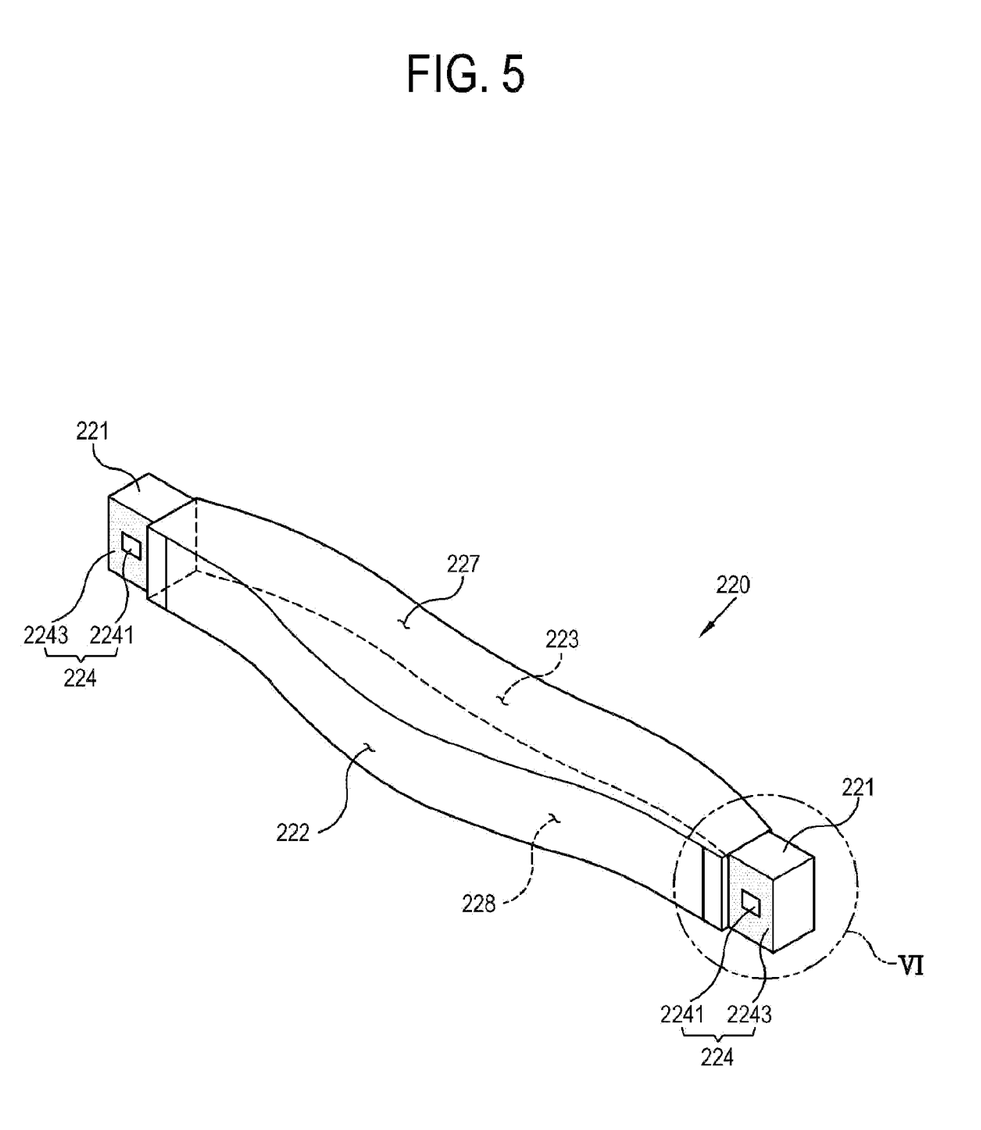
FIG. 5 is a perspective view of an f-θ lens shown in FIG. 2.

As shown in FIGS. 2 to 5, the f-θ lens 220 has an incident surface 222 into which the light L1 emitted by the light source 240 enters, an emitting surface 223 where the light having entered the incident surface 222 is emitted, a plurality of end parts provided at opposite sides in an extending direction, and a combining surface 224 arranged on each surface of the plurality of the end parts 221 so as to face the mount member 210. As shown in FIG. 5, the f-θ lens 220 further includes an upper surface 227 that is bent with respect to the incident surface 222 and the emitting surface 223, and a lower surface 228 opposite the upper surface 227.

The f-θ lens 220 focuses the light onto the photosensitive media 145Y, 145M, 145C, and 145K. The f-θ lens 220 also corrects aberrations while having a uniform refractive index with respect to an optical axis so that the light of a constant velocity reflected by the beam deflector 230 can be deflected uniformly in the main-scanning direction. To this end, the incident surface 222 and the emitting surface 223 of the f-θ lens 220 may be provided to have a non-spherical shape formed according to a proper optical design.

Figure 6:
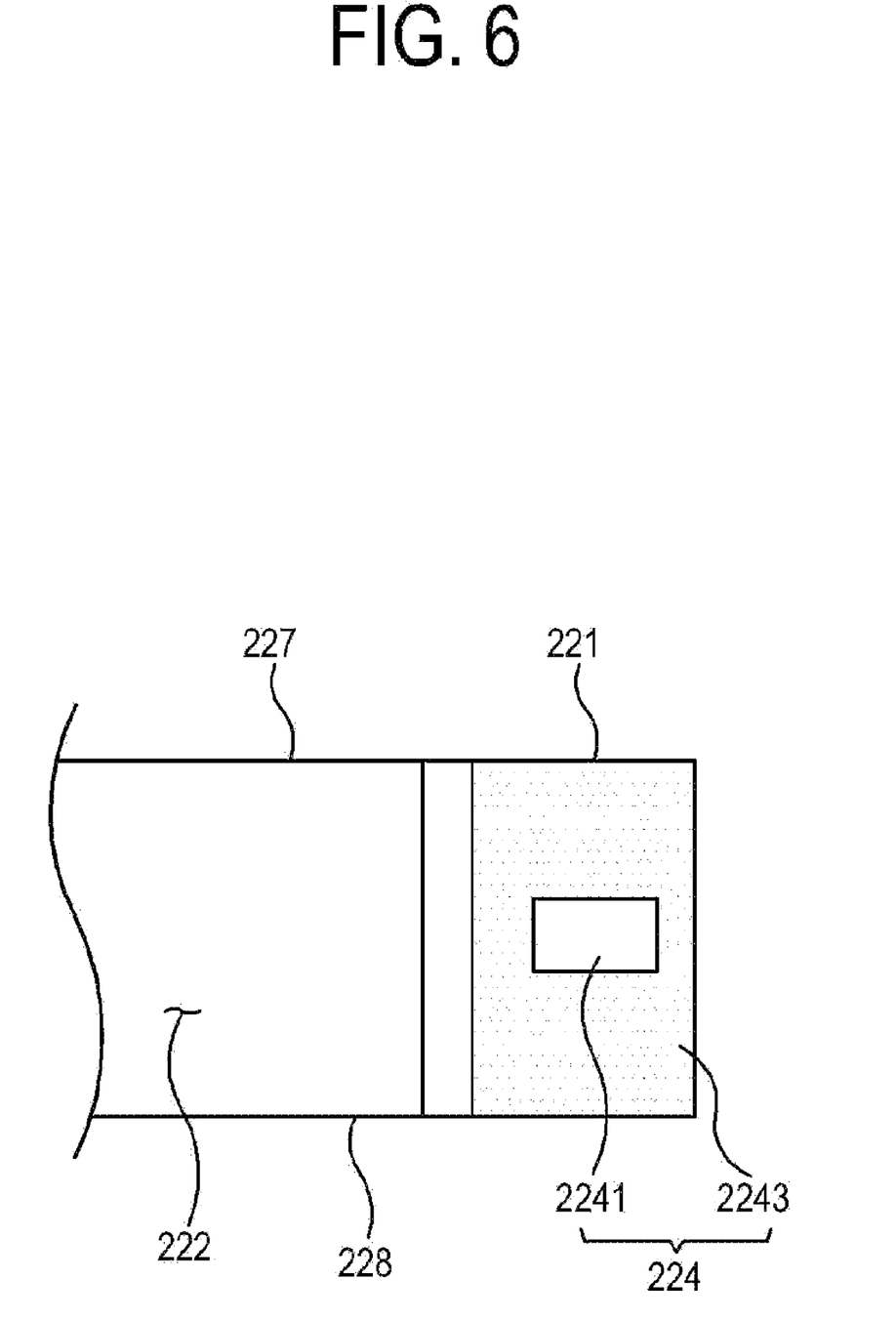
FIG. 6 is an expanded perspective view of a combining surface part VI of the f-θ lens shown in FIG. 5.

As shown in FIGS. 5 and 6, the combining surface 224 of the f-θ lens 220 may include a first combining surface 2241 and a second combining surface 2243. The first combining surface 2241 and the second combining surface 2243 are provided to have different transmittance to a curing light (refer to L2 in FIG. 4).

If the f-θ lens 220 is made of plastics, the f-θ lens 220 may usually be formed by extrusion or injection using a mold (not shown). Such a forming process is known to the public, as can be seen in Korean Patent Application No. 2004-39629 and Korean Patent Publication No. 2006-13611. As a surface roughness of the f-θ lens 220 is high directly after the f-θ lens 220 is formed by the extrusion or the injection using the mold (not shown), a surface machining process is performed on the f-θ lens 220 so that the incident surface 222 and the emitting surface 223 can have a desired light transmittance.

The surface machining process may be performed so that at least one of the first combining surface 2241 and the second combining surface 2243 have different surface roughness, thus making the transmittance of the curing light (refer to L2 in FIG. 4) different between the first combining surface 2241 and the second combining surface 2243.

For example, if the first combining surface 2241 goes through the surface machining process until the first combining surface 2241 becomes transparent, almost all of the curing light (refer to L2 in FIG. 4) can be made to pass through the first combining surface 2241. On the other hand, if the second combining surface 2243 goes through the surface machining process to have surface roughness higher than the first combining surface 2241, the transmittance of the curing light (refer to L2 in FIG. 4) can be made to be comparably lower than that in the first combining surface 2241.

If necessary, the surface roughness of surfaces of the mold (not shown) corresponding to the first and the second combining surfaces 2241 and 2243 may be adjusted, thus making the transmittance of the curing light (refer to L2 in FIG. 4) different between the first and second combining surfaces 2241 and 2243. Alternatively, the first combining surface 2241 and the second combining surface 2243 may be coated with a reflective material that reflects the curing light, thus making the transmittance of the curing light (refer to L2 in FIG. 4) different between the first and second combining surfaces 2241 and 2243.

According to a process of installing the f-θ lens 220 onto the mount member 210 according to an example embodiment of the present invention, an adhesive 260 that is cured when exposed to the curing light L2 is applied onto the combining surface 224 of the f-θ lens 220, as shown in FIG. 4. The curing light may be an ultraviolet ray, and the adhesive 260 may be an ultraviolet-curing adhesive that is cured by the ultraviolet ray.

The f-θ lens 220 is placed on the lens height reference protrusion 213 of the mount member 210. Then, a position of the f-θ lens 220 is adjusted using an assembling jig (not shown), so that the f-θ lens 220 can be disposed in a desired position. As the ultraviolet ray L2 has not been illuminated onto the adhesive 260, the position of the f-θ lens 220 can be adjusted.

After the position adjustment is completed, the ultraviolet ray L2 is illuminated toward the combining surface 224 at opposite end parts. Accordingly, as shown in FIG. 4, first adhesive 261, which has been applied on the first combining surface 2241 disposed at each opposite end part of the f-θ lens 220 in an extending direction, is cured first, thus fixing the position of the f-θ lens 220. After the position of the f-θ lens 220 is fixed, second adhesive 263 on the second combining surface 2243 is cured, thus still more reinforcing the adhesive strength of the f-θ lens 220. If necessary, the adhesive 260 may not be applied onto the combining surface 224 first, but may be inserted between the combining surface 224 and the mount member 210 after the position of the f-θ lens 220 has been adjusted.

The smaller the amount of the first adhesive 261, the smaller is the change in volume of the adhesive arising when the adhesive is cured, thus minimizing deviation of the f-θ lens 220 from the position where the f-θ lens 220 was originally disposed. Therefore, one of the first combining surface 2241 and the second combining surface 2243 that has comparably smaller surface area may have a higher transmittance of the curing light. Accordingly, as shown in FIGS. 5 and 6, the transmittance of the curing light of the first combining surface 2241 that has comparably smaller surface area may be higher than that of the second combining surface 2243.

The surface area of the first combining surface 2241 may be properly determined such that the adhesive strength of the adhesive on the first combining surface 2241 can prevent positional deviation of the f-θ lens 220 due to the volume change of the adhesive on the second combining surface 2243. The whole surface area of the first combining surface 2241 and the second combining surface 2243 may be determined so that the adhesive strength of the whole adhesive can be maintained during a desired period of time.

According to necessity, if the positional deviation of the optical element due to the cure of the adhesive is of a tolerable level because the optical element to be installed onto the mount member does not have an elongated shape in a specific direction similarly to the f-θ lens 220, the transmittance of the curing light may be freely provided to be different between the first combining surface 2241 and the second combining surface 2243, irrespective of the surface areas.

Figure 7A:
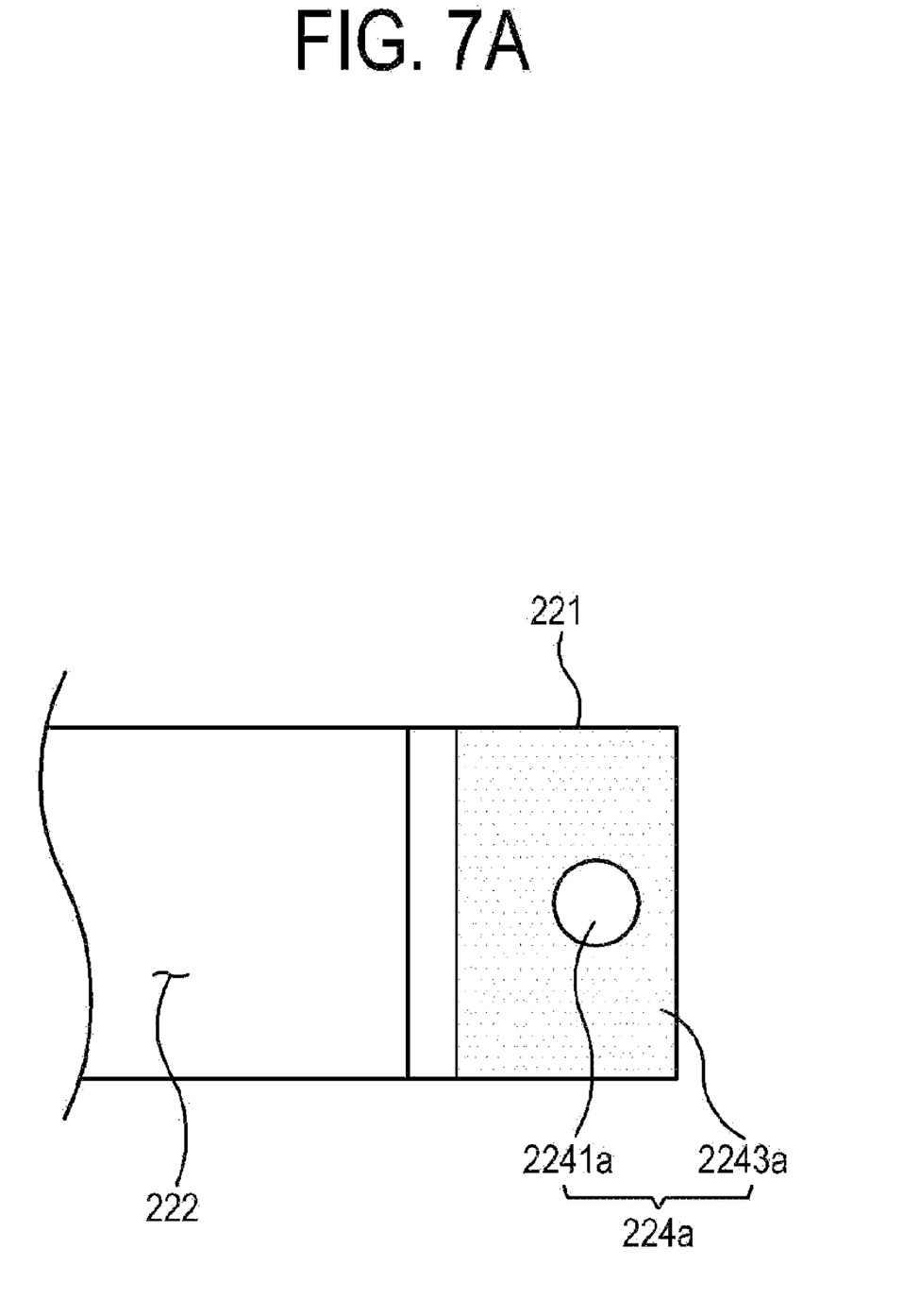
FIGS. 7A to 7C shows modifications of the combining surface of the f-θ lens shown in FIG. 5.
Figure 7B:
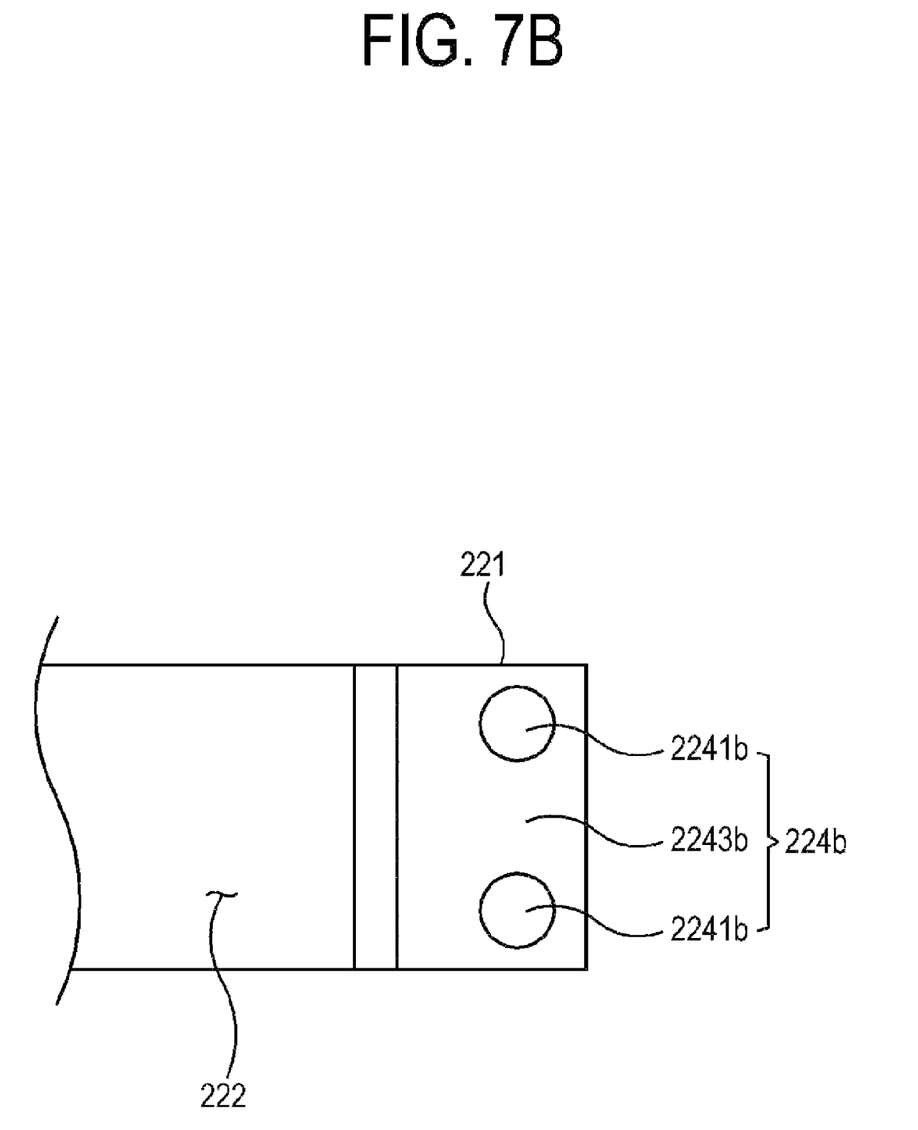
Figure 7C:
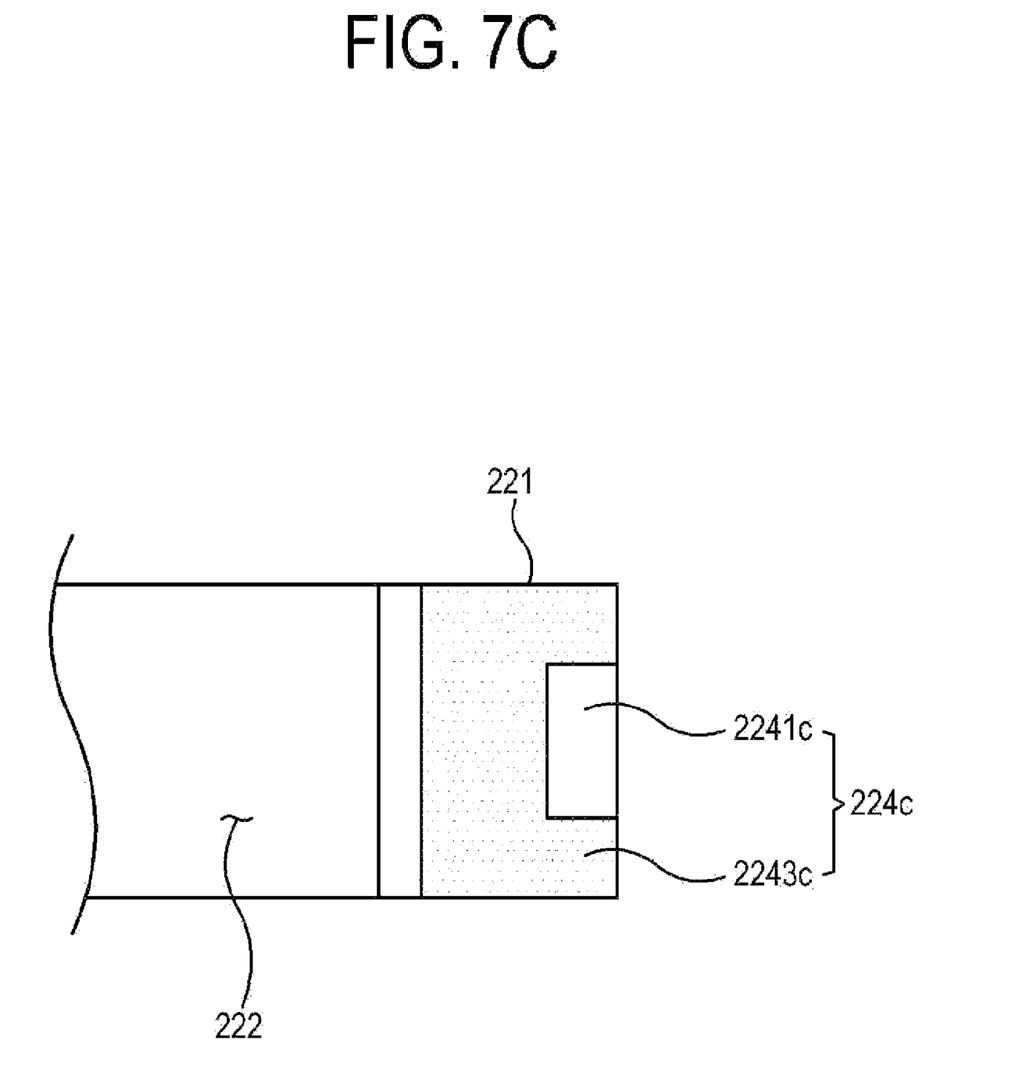

However, as shown in FIGS. 7A to 7C, the combining surfaces 224a, 224b, and 224c may be changed in various ways. The first combining surface 2241a in FIG. 7A may be provided as a circle, while the first combining surface 2241 in FIG. 6 is a rectangle. As shown in FIG. 7B, the first combining surface 2241b may be provided as two circles. In FIGS. 7A and 7B, the second combining surfaces 2243a and 2243b are provided to surround the first combining surfaces 2241a and 2241b. As shown in FIG. 7C, the first combining surface 2241c may be disposed at an edge of an end part 221 of the f-θ lens 220, so that the first combining surface 2241c cannot be surrounded by the second combining surface 2243c.

As shown in FIG. 6 and FIGS. 7A to 7C, the combining surfaces 224, 224a, 224b and 224c are provided at opposite end parts 221 disposed in the extending direction of the f-θ lens 220 respectively. The combining surfaces 224, 224a, 224b, and 224c fixedly support the opposite end parts 221 disposed in the extending direction thereof, because the position of the f-θ lens 220 may deviate easily in the extending direction while the f-θ lens 220 may be disposed in a height direction with a comparably high precision by using the lens height reference protrusion 213.

Figure 9:
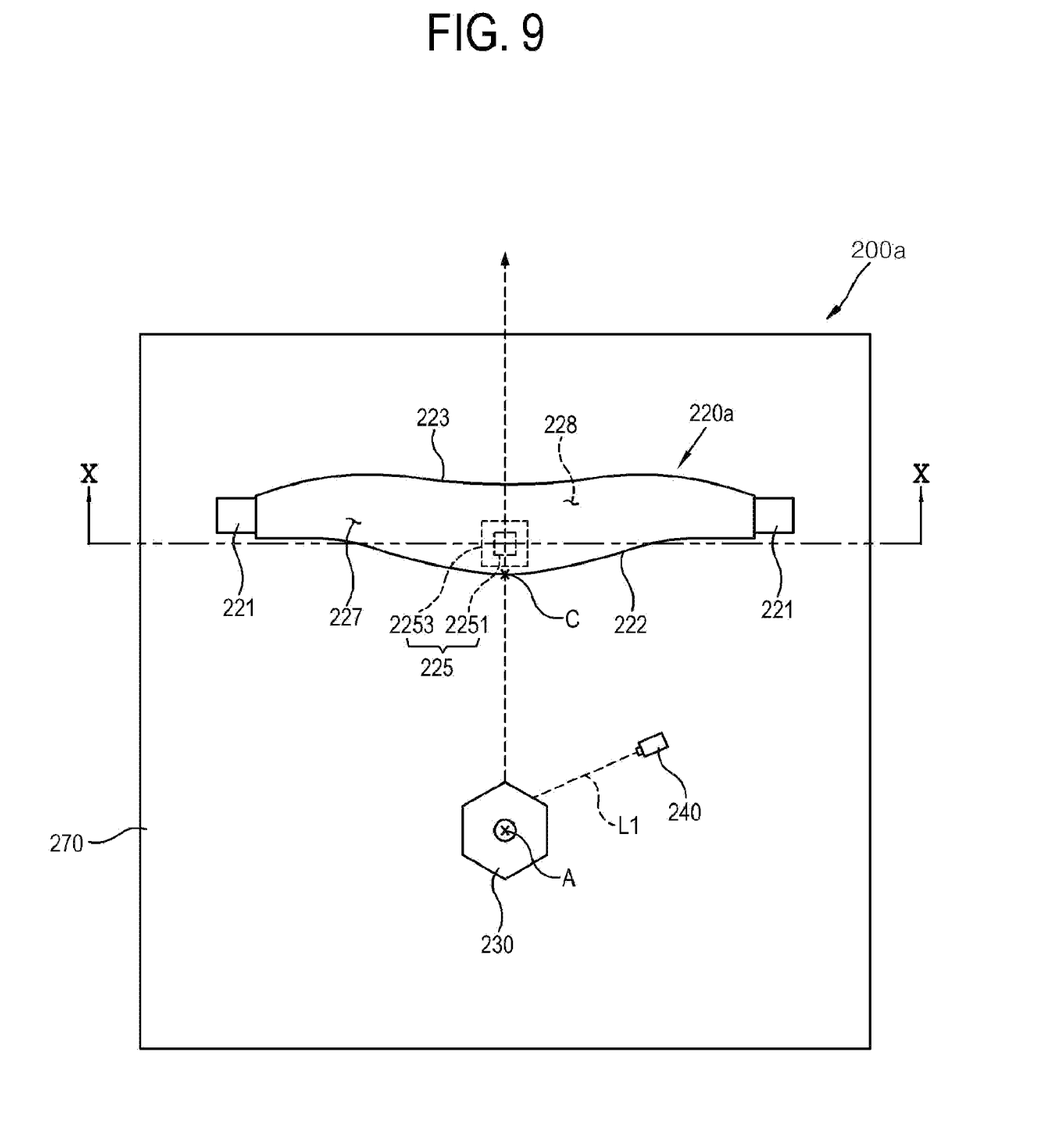
FIG. 9 is a schematic plan view of an optical unit according to another example embodiment of the present invention.
Figure 10:
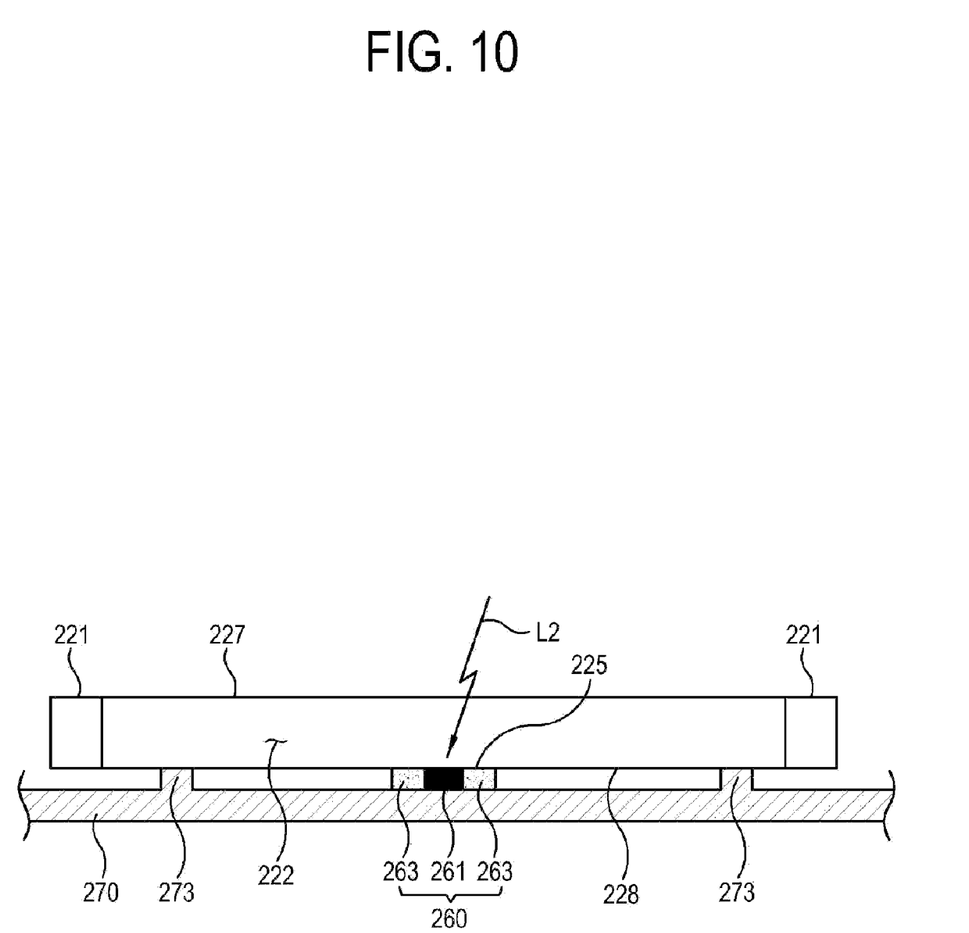
FIG. 10 is a sectional view of an optical unit along X-X of FIG. 9.

FIG. 9 is a schematic plan view of an optical unit 200a according to another example embodiment of the present invention. FIG. 10 is a schematical expanded-sectional view of the optical unit 200a along X-X in FIG. 9.

The laser scanning unit 200 is a tandem type where lights corresponding to four colors can be focused onto a predetermined image forming surface at the same time using the four light sources 240 and the four f-θ lenses 220. However, the laser scanning unit 200a is a mono type where only one f-θ lens 220 is used. The mono type laser scanning unit may usually be used in an image forming apparatus that outputs image data of a single color, such as a monochrome laser printer or a monochrome copying machine.

As shown in FIGS. 9 and 10, the laser scanning unit 200a includes a mount member 270 and one f-θ lens 220a. While the combining surface 224 of the f-θ lens 220 is provided at opposite end parts 221 of the f-θ lens 220 as shown in FIG. 5, the f-θ lens 220a has a combining surface 225 provided at a center part of the lens 220.

As shown in FIG. 9, the combining surface 225 may be provided at the center part of the lens on a lower surface 228 of the f-θ lens 220a. If necessary, if an upper surface 227 of the f-θ lens 220a is combined with the mount member 270, the combining surface 225 may be provided on the upper surface 227. The combining surface 225 may be provided so that a center point of the combining surface 225 can be disposed on an extending line (light axis) connecting a lens center C of the f-θ lens 220a and a rotating center A of a beam deflector 230.

The combining surface 225 includes a first combining surface 2251 that has a higher transmittance of the curing light L2 and a second combining surface 2253 that surrounds the first combining surface 2251 and has a lower transmittance of the curing light L2 than the first combining surface 2251. The first combining surface 2251 may have a smaller surface area than the second combining surface 2253.

As shown in FIG. 10, adhesive 260 is applied to the combining surface 225 of the f-θ lens 220a, and the f-θ lens 220a is placed on a lens height reference protrusion 273. The f-θ lens 220a is disposed at a desired position and the curing light L2 is irradiated toward the combining surface 225. As a result, first adhesive 261 applied to the first combining surface 2251 is cured before second adhesive 263 applied to the second combining surface 2253 is cured.

Although the position of the combining surface has been described to be provided at opposite end parts of the f-θ lens in the extending direction or at the center part thereof, the position is not so limited and may be changed in various ways. The shape of the combining surface may also be variously changed.

Figure 8:
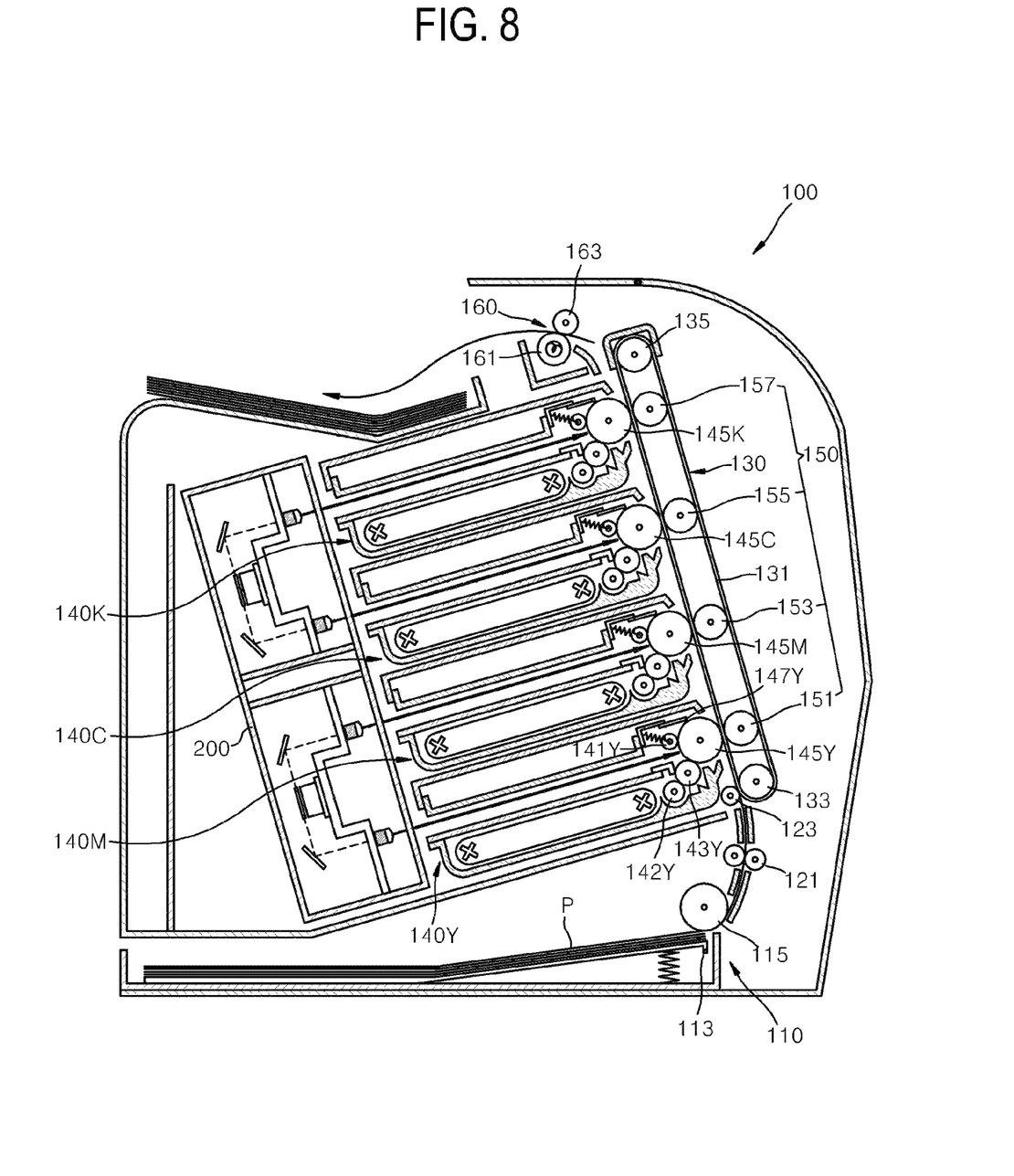
FIG. 8 is a schematic sectional view of an image forming apparatus having the optical unit shown in FIG. 2.

As shown in FIG. 8, an image forming apparatus 100 according to an example embodiment of the present invention includes a paper feeding unit 110; a belt unit 130; a plurality of developing cartridges 140Y, 140M, 140C, and 140K; a transfer unit 150; a fusing unit 160; and the laser scanning unit 200. According to other aspects of the invention, the image forming apparatus may be a monochrome image forming apparatus and, accordingly, may contain one developing cartridge 140K and the laser scanning unit 200a.

The belt unit 130 includes a belt 131 and supporting rollers 133 and 135 that rotatably support the belt 131. The belt 131 may be made of a conductive material so that the belt 131 can receive a printable medium conveyed by a conveying roller 121 with an electrostatic attraction.

The developing cartridges 140Y, 140M, 140C, and 140K store developers of colors of yellow Y, magenta M, cyan C, and black K, respectively. Only a configuration of the yellow developing cartridge 140Y is described because the other developing cartridges 140M, 140C, and 140K have the same configuration as the yellow developing cartridge 140Y barring the color of the stored developer.

The yellow developing cartridge 140Y includes a charging roller 141Y, a supplying roller 142Y, a developing roller 143Y, and a photosensitive medium 145Y. The charging roller 141Y charges the surface of the photosensitive medium 145Y to have a uniform electric potential before the laser scanning unit 200 scans the light onto the photosensitive medium 145Y. The supplying roller 142Y supplies the yellow developer stored in the yellow developing cartridge 140Y to the developing roller 143Y and frictionally charges the developer to have a negative electric charge. The developing roller 143Y develops the surface of the yellow photosensitive medium 145Y with the developer frictionally charged to have the negative electric charge. The developing roller 143Y may also be called a developing unit.

The transfer unit 150 includes a plurality of transfer rollers 151, 153, 155, and 157. Each of the transfer rollers 151, 153, 155, and 157 is disposed parallel to one of the photosensitive media 145Y, 145M, 145C, and 145K of the yellow, magenta, cyan and black developing cartridge 140Y, 140M, 140C, and 140K (to be described later) between the photosensitive media and the belt 131.

The laser scanning unit 200 scans lights corresponding to image data of respective yellow, magenta, cyan, and black colors required to be printed, onto the surfaces of the photosensitive media 145Y, 145M, 145C and 145K. Accordingly, an electrostatic latent image corresponding to the image data of each color is formed on the surface of the respective photosensitive medium 145Y, 145M, 145C, 145K.

A color printing process of the image forming apparatus having the above configuration is briefly described. A printable medium P loaded in the paper feeding unit 110 is picked up by a pick-up roller 115 and conveyed by the conveying roller 121. The conveying roller 121 aligns the printable medium P, and conveys the printable medium P timely to the belt unit 130 so that a yellow developer visualized image can be transferred onto a printing area of the printable medium P.

When the printable medium P is conveyed to the belt unit 130, a surface of the printable medium P is charged with static electricity by a medium charging roller 123 having a high voltage, so that the printable medium P can be transferred onto the belt 131. The printable medium P is conveyed to between the yellow photosensitive medium 145Y and the transfer roller 151 along a rotating direction of the belt 131.

The electrostatic latent image corresponding to the yellow image data is formed on the yellow photosensitive medium 145Y charged by the charging roller 141Y. The electrostatic latent image is developed with the yellow developer stored in the developing cartridge 140Y by the developing roller 143Y. Accordingly, the yellow developer visualized image consisting of the yellow developer is formed on the surface of the yellow photosensitive medium 145Y.

The yellow developer visualized image is transferred onto the printable medium P, which is conveyed to the yellow photosensitive medium 145Y by the transfer roller 151. The transfer roller 151 is applied a high voltage having a polarity opposite to the charge of the developer. As a result, the yellow developer visualized image can be transferred to the printable medium P by electric attraction.

The printable medium P passes through between the remaining photosensitive media 145M, 145C, 145K and the transfer rollers 153, 155, 157; and magenta, cyan and black developer visualized images are applied onto the printable medium P respectively. Accordingly, a complete color developer image is formed on the printable medium P.

The color developer image passes through the fusing unit 160 having a heat roller 161 and a press roller 163 to be fused on the printable medium P by heat and pressure. The printable medium P having the image formed thereon is discharged to the outside of the apparatus, thus finishing the color printing process.

Figure 11:
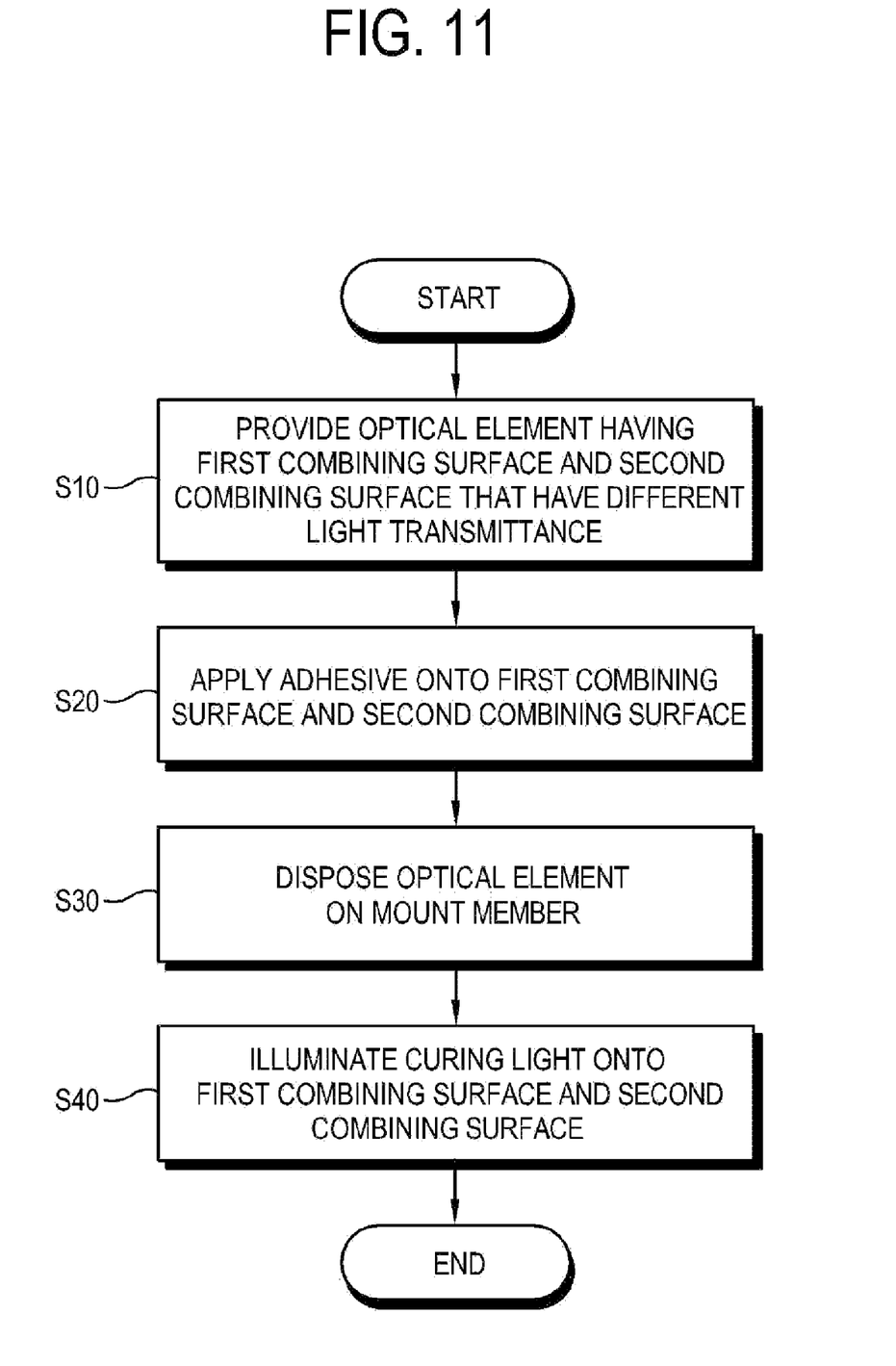
FIG. 11 is a flowchart of a method for manufacturing the optical unit according to an example embodiment of the present invention.

A manufacturing method of the optical unit according to an example embodiment of the present invention is described with reference to FIG. 11. First, an optical element having the first combining surface and the second combining surface, which are respectively applied with the adhesive that is cured when exposed to the curing light and which have different transmittance of the curing light from each other, is provided at block S10. The optical element may be the f-θ lens 220 or 220a described above. The curing light may be the ultraviolet ray and the adhesive may be the ultraviolet-curing adhesive. The adhesive is applied onto the first combining surface and the second combining surface at S20.

The optical element is disposed at a predetermined position on the mount member, where the optical element is to be installed, at block S30. If necessary, a position adjustment may be made so that the optical element can be disposed at a desired position. The curing light is illuminated toward the first combining surface and the second combining surface at block S40. The curing light is transmitted through the first combining surface and the second combining surface to cure the adhesive. Since the light transmittance of the first combining surface and the second combining surface is different, the adhesive cures at a different rate, thus minimizing the deviation caused by the contraction of the adhesive in the curing process.

At block S20, instead of applying the adhesive onto the first combining surface and the second combining surface before the optical element is disposed, the adhesive may be inserted between the first and second combining surfaces and the mount member after the optical element has been disposed.

According to aspects of the present invention, several effects can be obtained. The optical element can be precisely mounted onto the mount member by minimizing the volume contraction arising from curing the adhesive. The manufacturing process of the optical unit can be reduced. As the mask member is not required, the manufacturing process of the optical unit can be reduced. Accordingly, the time required to manufacture the optical unit can also be reduced. As the manufacturing process is reduced and additional devices, such as the mask member, are not required, the manufacturing cost of the optical unit can be reduced. As the combining surface to be combined to the mount member is processed beforehand while manufacturing of the optical element, the manufacturing process of the optical unit can be reduced.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, although the laser scanner 200 and 200a is described in conjunction with an image forming apparatus, the laser scanner 200 may be used in any device where a laser scanner may be used. Similarly, although the lens is described as an f-θ lens, the lens may be any type of lens that is coupled to a mount via an adhesive. Accordingly, it is intended, therefore, that the present invention not be limited to the various example embodiments disclosed, but that the present invention includes all embodiments falling within the scope of the appended claims.

What is claimed is:

1. An image forming apparatus comprising:
    an optical unit comprising:
        an optical element with a first combining surface and a second combining surface, the first and second combining surfaces being coated with an adhesive to be cured when exposed to a curing light and the first and second combining surfaces having different transmittance of the curing light such that the adhesive coating the first and second combining surfaces cures at different rates, and
        a mount member combined with the optical element by the adhesive;
    a photosensitive medium having a surface exposed by the optical unit to form an electrostatic latent image corresponding to image information;
    a developing unit to develop the electrostatic latent image with developer; and
    a transfer unit to transfer the developed electrostatic latent image to a printable medium.

2. The image forming apparatus according to claim 1, wherein the first combining surface and the second combining surface have different surface roughness.

3. The image forming apparatus according to claim 2, wherein the optical unit further comprises:
    a light source to emit light corresponding to image information; and
    wherein the optical element is an f-θ lens to focus the light emitted by the light source onto a predetermined focusing surface.

4. The image forming apparatus according to claim 3, wherein one of the first combining surface and the second combining surface surrounds the other.

5. The image forming apparatus according to claim 4, wherein:
   the first combining surface and the second combining surface make a pair, and
   the f-θ lens has a plurality of the pairs of the first combining surface and the second combining surface.

6. The image forming apparatus according to claim 1, wherein the optical unit further comprises:
   a light source to emit light corresponding to image information; and
   wherein the optical element is an f-θ lens to focus the light emitted by the light source onto a predetermined focusing surface.

7. The image forming apparatus according to claim 6, wherein one of the first combining surface and the second combining surface surrounds the other.

8. The image forming apparatus according to claim 7, wherein:
   the first combining surface and the second combining surface make a pair; and
   the f-θ lens has a plurality of the pairs of the first combining surface and the second combining surface.

9. The image forming apparatus according to claim 8, wherein each of the plurality of the pairs of the first combining surface and the second combining surface is provided at opposite end parts of the f-θ lens in an extending direction of the f-θ lens.

10. The image forming apparatus according to claim 1, wherein one of the first combining surface and the second combining surface has a smaller surface area than the other and has a higher light transmittance than the other.

11. The image forming apparatus according to claim 3, wherein one of the first combining surface and the second combining surface has a smaller surface area than the other and has higher light transmittance than the other.

12. An optical element comprising a body provided with a first combining surface and a second combining surface, the first and second combining surfaces being coated with an adhesive to be cured when exposed to a curing light and the first and second combining surfaces having different transmittance of the curing light such that the adhesive coating the first and second combining surfaces cures at different rates.

13. A laser scanner comprising:
   a mount member;
   a lens mounted to the mount member to focus laser light onto a predetermined surface;
   a reflecting mirror arranged on the mount member to reflect the laser light onto the lens;
   a beam deflector arranged on the mount member to deflect the laser light onto the reflecting mirror; and
   a light generator arranged on the mount to generate the laser light;
   wherein the lens is mounted to the mount member at a designated area by an adhesive to be cured when exposed to a curing light applied to first and second portions of the designated area having different rates of light transmittance of the curing light such that the adhesive applied to the first and second portions of the designated area cures at different rates.

14. The laser scanner according to claim 13, wherein the first combining surface has a surface roughness different than a surface roughness of the second combining surface.

15. The laser scanner according to claim 13, wherein the lens is an f-θ lens.

16. The laser scanner according to claim 13, wherein the f-θ lens has a plurality of pairs of first combining surfaces and second combining surfaces.

17. The laser scanner according to claim 13, wherein the first portion is surrounded by the second portion.

18. The laser scanner according to claim 13, wherein the designated area is at an end part of the lens.

19. The laser scanner according to claim 13, wherein the curing light is an ultraviolet light and the adhesive is to be cured using an ultraviolet light.

20. The laser scanner according to claim 13, wherein the first portion and the second portion are coated with different amounts of a reflective material.

21. The laser scanner according to claim 13, wherein the first portion has a surface area smaller than a surface area of the second portion.

22. The laser scanner according to claim 13, wherein the designated area is a center part of the lens.

23. The laser scanner according to claim 13, wherein the mount has a lens height reference protrusion onto which the lens is coupled.

* * * * *